United States Patent [19]
Debourg et al.

[11] Patent Number: 5,743,034
[45] Date of Patent: Apr. 28, 1998

[54] HOUSEHOLD STEAM APPLIANCE HAVING A SCALE-PREVENTING DEVICE

[75] Inventors: Jean Pierre Debourg, Lyons; Denis Daulasim, Villeurbanne; Jean Claude Ledion, Paris, all of France

[73] Assignee: SEB S.A., France

[21] Appl. No.: 785,237

[22] Filed: Jan. 17, 1997

[30] Foreign Application Priority Data

Jan. 19, 1996 [FR] France .................... 96 00822

[51] Int. Cl.$^6$ .................... D06F 75/12; D06F 75/14
[52] U.S. Cl. .................... 38/77.8; 38/77.83; 38/84
[58] Field of Search .................... 38/77.3, 77.8, 38/77.83, 77.6, 82, 84, 85, 14, 16, 66; 392/401, 402, 404, 405; 219/687, 245, 255; 68/222; 210/94, 282; 223/51, 70

[56] References Cited

U.S. PATENT DOCUMENTS

| | | | |
|---|---|---|---|
| 2,961,525 | 11/1960 | Riker | 392/401 |
| 4,875,249 | 10/1989 | Collier | 68/222 X |
| 4,969,393 | 11/1990 | Mahlick et al. | 38/77.8 X |
| 5,063,697 | 11/1991 | Valente et al. | |
| 5,189,726 | 2/1993 | Pan | 392/401 |
| 5,468,395 | 11/1995 | Carron et al. | |

FOREIGN PATENT DOCUMENTS

| | | |
|---|---|---|
| 0 557 901 A1 | 9/1993 | European Pat. Off. . |
| 0 558 402 A1 | 9/1993 | European Pat. Off. . |
| 2 632 331 | 12/1989 | France . |
| 2 648 163 | 12/1990 | France . |

*Primary Examiner*—Ismael Izaguirre
*Attorney, Agent, or Firm*—Loeb & Loeb LLP

[57] ABSTRACT

A method and device for preventing the formation of scale in an electric appliance for producing steam, which appliance includes a reservoir for holding a quantity of water and a steam generation member for effecting a substantially instantaneous generation of steam; and a scale preventing device. Scale formation is prevented by heating water upstream of the reservoir to a temperature and for a time sufficient to precipitate minerals present in the water into a form which allows the precipitated minerals to be expelled from the appliance with steam generated by said steam generation member.

22 Claims, 2 Drawing Sheets

HOUSEHOLD STEAM APPLIANCE HAVING A SCALE-PREVENTING DEVICE

BACKGROUND OF THE INVENTION

The present invention relates to a household appliance that utilizes steam, particularly an appliance for generating steam substantially instantaneously, without a mass of boiling water, such as a clothes pressing iron, this appliance including a scale-preventing device for treating water which can be stored in a reservoir, from which the water can be directed into a chamber for substantially instantaneous generation of steam.

One of the major challenges with this type of appliance is to be able to utilize any type of tap water without risking deterioration of the appliance by deposits, or coatings, of mineral substances, particularly deposits of calcium, lime, etc., which deposits are commonly known as scale. Such deposits on water or steam conduits or passages can bring about their progressive obstruction, as well as obstruction of the steam outlet openings provided in the sole plate of an iron. In addition, scale deposits against the walls of the steam chamber reduce heat exchange.

This problem is of particular concern because it is presently necessary to use demineralized water exclusively in order to properly maintain a household electric appliance. In effect, either suitable water must be purchased on a regular basis at a relatively high cost, or the water must be treated at the time of refilling the appliance reservoir by causing the water to flow through a cartridge containing demineralizing material, this cartridge only permitting a low flow rate because of the resistance to flow which it creates. When ion exchange resin contained in the cartridge is no longer capable of retaining calcium in the water, it can for example undergo a change in color, which indicates to the user that the cartridge, or the filter material, must be replaced.

In this connection, pressing irons comprising a device for eliminating or altering minerals contained in the water to be vaporized are known, this device, called an anti-scale device, eliminating the need to disassemble the appliance in order to mechanically or chemically remove deposited scale, which is costly and inconvenient.

French patent document 2 648 163 discloses a pressing iron comprising a cartridge enclosing a demineralizing product, such as an ion exchange resin, disposed between the water outlet of the storage reservoir and the steam chamber. Thus, the user no longer has to handle a cumbersome cartridge during refilling of the reservoir. However, it is always necessary to observe either the color of the internal resin or the duration of its utilization in order to be aware of when it is necessary to replace or regenerate the resin, a task which is too often forgotten in daily life.

French patent document 2 632 331 discloses a pressing iron comprising means for introducing into the water reservoir, during each refilling or operating period, a predetermined quantity of a chemical compound, such as formic acid, impeding the formation of scale in the steam chamber. Other products can precipitate the calcium in the form of salt, or modify the form of the scale in order to place it in a form in which it will not build up. However, it is also necessary to periodically determine if the corresponding cassette still contains the chemical compound or if it must be replaced. In addition, the mechanical dosing device is complex and thus costly.

Alternatively, the product can be integrated into the pressing iron during manufacture, in a quantity sufficient to last for the expected useful life and suitable for use with most types of water that might be encountered. However, the dosage can then only be imprecise, which limits its efficiency. This leads particularly to the provision of an excessive amount of the product if it is used with naturally soft water, which is not ecologically desirable.

SUMMARY OF THE INVENTION

On object of the present invention is to overcome the drawbacks cited above by providing a household electric steam generating appliance comprising an effective anti-scale device in such a manner that it can be utilized in an optimum fashion even with tap water of any quality. Preferably, this device no longer requires practically any attention or special handling by the user, either during refilling, or during operation of the appliance. Also preferably, the useful life of the device should be longer than that of the appliance, particularly without requiring any regular addition of a chemical product. Finally, the structure of the device and of its constituent elements must be simple in order that it will operate reliably over the course of time, and should be easy to fabricate and assemble, in order to reduce as well the fabrication costs.

These goals are achieved by the fact that the anti-scale device according to the invention comprises means for thermally precipitating the scale-forming minerals upstream of the steam generating means.

The invention is based in substantial part on the unexpected discovery that a simple heating of water containing dissolved minerals is sufficient to trigger a germination of minerals contained in the water. Practical tests have in addition shown that the nuclei, or seeds, thus generated remain mobile within the body of water, then crystallize and rest in powdered form during steam generation, which facilitates their removal from the appliance by entrainment in the steam which is ejected from the steam generating means.

This solution according to the invention, based on an infinitely repeatable physical phenomenon, and contrary to all of the known solutions associated with household electric appliances, which are based on chemical phenomena, permits the consumer to be freed from the need to regularly introduce some product into the appliance.

Thus, in the case of a steam pressing iron, rather than allowing minerals to precipitate by being deposited and owing, as scale, in an uncontrolled manner in the steam generation chamber, with risks of obstructing, if not completely blocking, all of the stem outlet openings in the ironing sole plate, this phenomenon is intentionally initiated at an earlier point in the water ahead of the steam chamber in order to promote a precipitation that will not form scale deposits, but rather allows the minerals to be evacuated naturally during ejection of steam from the appliance.

Advantageously, the means which produce the desired form of precipitation by the application of heat, referred to herein as thermoprecipitation means, are constituted by a water heating zone, particularly a reservoir. It is then possible to maintain the water in this zone during a given period of time, in order that the germination is produced.

Advantageously, the water contained in the water heating zone or in the heating reservoir is maintained at a temperature at least higher than 60° C., and preferably at a temperature between 90° C. and 100° C., i.e., a temperature as close as possible to boiling temperature while preferably remaining lower than boiling temperature.

This intentional germination phenomenon becomes clearly apparent starting from a temperature of 60° C.

However, the preferred temperature range cited above permits a substantial increase in the rate of precipitation of the dissolved minerals, while avoiding the difficulties and disturbances of boiling. In addition, the movements within the body of water are created by this temperature, to which may be added possible physical movements of the appliance itself, to facilitate a liberation of dissolved carbon dioxide, reducing the risks of subsequent precipitations in the steam chamber.

According to a first embodiment of the invention, the heating reservoir of the anti-scale device is the reservoir normally provided for the storage of water, and the container of which is completed with heating and control means. The upper surface of the reservoir can then be constructed in a manner to assure thermal protection and/or can be furnished with refractory material.

This embodiment proves to be rather simple to manufacture and readily lends itself to inexpensive mass production, the large quantity of water which is present in the heating reservoir permitting development of germination of mineral materials over a long period and thus attainment of a useful precipitation rate.

According to a second embodiment, the reservoir of the anti-scale device is an auxiliary reservoir furnished with regulated heating means, and, if desired, constructed in a manner to assure thermal protection and/or provided with refractory material. Preferably, the volume, or size, of this auxiliary reservoir is selected on the basis of the maximum possible flow rate of steam to be achieved so that the water is maintained at the necessary elevated temperature during a time period which allows at least part of the germination to occur or during a time period corresponding substantially to the anticipated time required to cause germination of all dissolved minerals. According to the applicable conditions, this time is obviously variable, but tests performed without any catalysts or additives have shown that at least partial germination can be achieved in less than three minutes. Also preferably, this auxiliary reservoir is installed between the main reservoir for cold water and the steam generation chamber.

The use of an auxiliary reservoir permits optimization, to a sufficiently close value, of the supply of heat necessary for the development of a useful rate of intentional precipitation according to the invention. Its localization between the main reservoir and the steam chamber assures that the germination process is only effectuated shortly before conversion to steam, thus minimizing the risk of a redissolution of the precipitated material in cold water, even if this risk is limited, $CO_2$ having been liberated.

In the case of a pressing iron having a separate reservoir connected by an electric power cord and a water feed tube to a fixed station having a main water reservoir and a pump for conveying water into the feed tube, the auxiliary reservoir of the anti-scale device is installed in the fixed station between the main reservoir and the pump, the transfer of water from the main reservoir into the auxiliary reservoir being effectuated via a lower conduit according to the principle of communicating vessels. The auxiliary anti-scale reservoir thus localized in the fixed station then does not present practically any risk of danger to the user even if the fixed station is brought to a high temperature. In the case of a clothes-pressing iron having an integrated reservoir that includes a main water reservoir extending substantially horizontally above the steam generation chamber, the auxiliary reservoir is situated in proximity to the main water reservoir with which it is in communication by a passage, a channel opening into the lower part of the auxiliary reservoir leading the water towards the steam generation chamber. Preferably, for purposes of convenience, the auxiliary reservoir is situated at the rear end of the water reservoir with which it is in communication by a passage. When the auxiliary reservoir is in communication with the main reservoir by an orifice formed in its upper face, the main reservoir then comprises an inclined surface adjacent to the auxiliary reservoir, this surface starting from the base and ending slightly above the upper surface of the auxiliary reservoir; the upper edge of this surface, the upper surface of the auxiliary reservoir and the upper wall of the principal reservoir define a passage for water from the main reservoir into the auxiliary reservoir.

This compact arrangement is particularly appropriate for a pressing iron having an integrated reservoir, the heated auxiliary reservoir being positioned well into the lower rear part of the iron so that the main reservoir can constitute a protection zone between the handle of the iron and this auxiliary reservoir.

The steam generation chamber can be formed in a metal casting forming an element of the iron and the heating means can be an individual heating module containing electric resistance heating elements regulated in a known manner, for example, by a bimetallic element or more simply in the case of a pressing iron having an integrated reservoir, a thermo-bridge arranged between the casting of the steam generation chamber and the wall of the auxiliary reservoir, the dimensions of this bridge assuring a predetermined transfer of heat which is just sufficient to maintain the auxiliary reservoir at the desired temperature, and this starting from the regulated heat source constituted by this casting. Heating in these ways does not pose any particular technical problems and thus limits the fabrication costs.

It is to be noted that, in order to create steam, it is necessary to raise water in the liquid state from ambient temperature to boiling temperature, and then furnish the energy necessary to create a phase change. Now, in the embodiments described earlier herein, overall thermal delivery in the appliance remains substantially identical to that of existing appliances as long as the heating reservoir is correctly thermally insulated, the heat furnished by the intentional precipitation not having to be furnished during boiling and subsequent vaporization.

In addition, if the anti-scale device according to the invention has no effect in the case of soft water or demineralized water, it does not create any drawbacks when such water is employed. One can thus utilize the same household electric appliance with any type of water capable of being employed.

Usefully, one can install in the heating reservoir a means which permits activation of the germination of the mineral materials, such as natural or synthetic rock fragments. These fragments can be contained in a porous, possibly removable, envelope, or can have a cross-section greater than that of the outlet conduit. These fragments act in the manner of a catalyst by defining sites for activation of germination, which reduces the minimum time necessary for the water to rest in the heating reservoir. Agitation of the rock fragments provoked by movements of the pressing iron aids degassing of, or gas liberation from, the water.

Advantageously, the internal walls of the heating reservoirs can be coated or treated with a product or a compound preventing local scaling, such as a thin coating of stainless steel.

The present invention equally concerns a method for precipitating dissolved minerals for household electric appliances comprising means for generating steam substantially instantaneously, according to which method a predetermined quantity of water is preheated before vaporization. The preheating temperature is advantageously greater than 60° C. and is preferably between 90° C. and 100° C.

The invention will be better understood from an understanding of embodiments described solely by way of non-limiting example and illustrated in the drawing figure.

DESCRIPTION OF THE PREFERRED EMBODIMENTS

Figure 1:
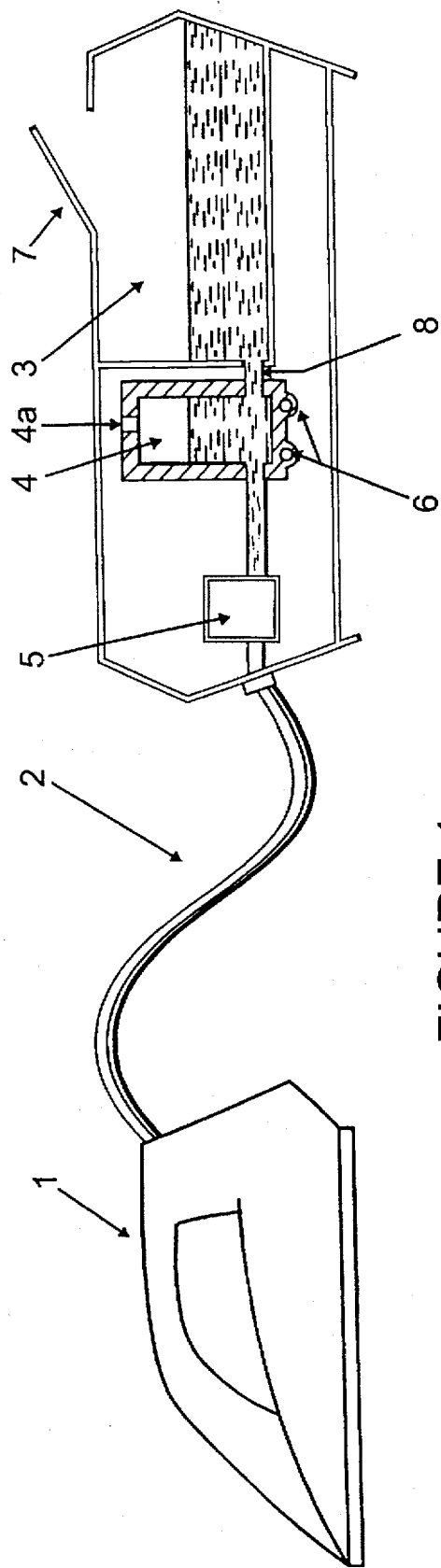
FIG. 1 is an elevational, pictorial view of a clothes pressing iron having a separate reservoir containing a scale-preventing device according to the invention.

FIG. 1 shows a pressing iron 1 coupled to an independent reservoir via a water supply hose or tube 2. The independent reservoir includes a main reservoir 3 having an inlet opening 7 which can be selectively closed by means of a lid or flap, etc., and an associated pump 5. Pressing iron 1 is itself movable in order to perform conventional clothes pressing operations. A power cord for conducting electric current between the fixed reservoir and iron 1 may form a unit with tube 2. Iron 1 contains a conventional internal device for generating steam which will then be propelled out of a plurality of steam orifices arranged in the sole plate at the bottom of iron 1 and in contact with the garment being ironed.

According to the invention, an auxiliary reservoir 4 is interposed in a conduit 8 which connects main reservoir 3 to pump 5. This auxiliary reservoir 4 is situated substantially at the same level as the main reservoir 3, and presents an opening 4a, so that auxiliary reservoir 4 is naturally supplied according to the principle of communicating vessels. This auxiliary reservoir 4 is furnished with an electric heating element 6 and a regulator permitting the water in auxiliary reservoir 4 to be brought to a temperature in the vicinity of 95° C. If desired, a thermal coating (not shown) allows the heat which must be supplied to the water in auxiliary reservoir 4 to be minimized, particularly by eliminating all risk of heating of water in main reservoir 3.

The mode of operation is the following: the user fills main reservoir 3 via opening 7. The water flows in auxiliary reservoir 4 by gravity and through conduit 8. The auxiliary reservoir 4 is heated by the electric heating element 6 in a manner that the water contained in auxiliary reservoir 4 is equally heated. This heating provokes a germination and thus formation of minuscule grains of mineral substances.

When the user actuates a control to initiate the arrival of steam, the pump 5 is placed in operation and aspirates water from the auxiliary reservoir 4, the water being withdrawn together with suspended grains, or particles, of mineral material, and this water is delivered into tube 2. The water is then instantaneously vaporized at the interior of the steam generation chamber of the iron 1. It has been noted in a surprising manner that the mineral substances which had thus been preliminarily precipitated do not adhere to the interior of the steam generation chamber and are carried, or entrained, by the steam as it is being produced, which does not in any way adversely affect a pressing operation. Opening 4a allows the escape of carbon dioxide, thus aiding degassing of water in the auxiliary reservoir 4 in order to promote germination and avoid a redissolution of the minerals in water which may have become cool.

In greater detail, significant quantities of $Ca^{2+}$ ions are present in water from most sources. Carbonate ions, $CO_3^{2-}$, are directly linked to the reaction of $OH^-$ ions with $HCO_3^-$ ions coming from atmospheric $CO_2$ gas dissolved in the water. Equilibrium of the ionic product of the calcium ions and the carbonate ions depends upon a coefficient Ks which is variable with temperature. For example, the coefficient $Ks = 1.22 \times 10^{-8}$ at 0° C.; and $0.81 \times 10^{-8}$ at 25° C. The coefficient Ks diminishing with an increase in temperature, it results therefrom that heating of the water augments the domain where carbonates become insoluble.

Pairs of hydrated ions of calcium and of carbonate then are grouped to form a germination initiator around which ionic layers are going to appear in order to form a colloidal seed which is positively charged and is mobile in water. Very fine particles of mineral substance germinate and grow in size and are then entrained with the water to the steam generation surfaces. Under these conditions, it is noted that the water which vaporizes instantaneously on hot surfaces of the steam generation chamber deposits its minerals in the form of very fine seeds which are not adherent to the surfaces, and that the size of these seeds does not increase, permitting their evacuation during release of the steam.

Moreover, it has equally been noted in numerous laboratory tests that the concentration of the heat flux supplied by the heating resistances which are overmolded into the body of the auxiliary reservoir has an effect on the kinetics and the threshold of precipitation of the minerals. A higher flux density allows, in fact, a very substantial carbonate super-saturation in the vicinity of the resistance.

Figure 2:
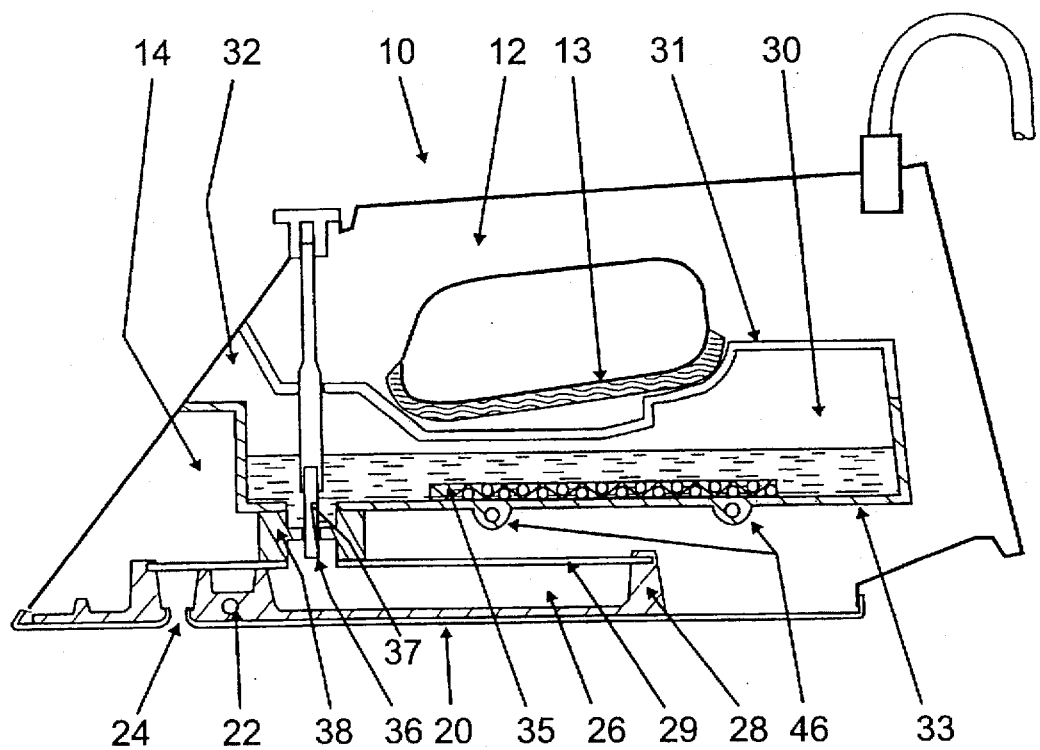
FIG. 2 is an elevational, cross-sectional view showing the essential components of a clothes pressing iron equipped with an integrated scale-preventing device according to one embodiment of the invention.
Figure 3:
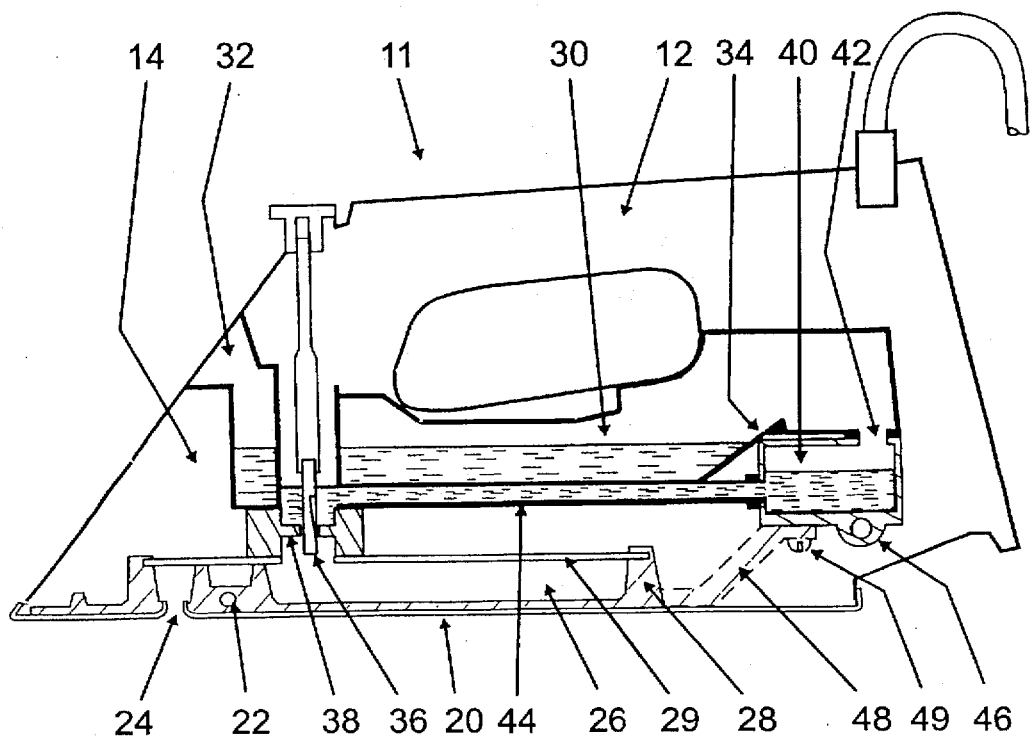
FIG. 3 is a view similar to that of FIG. 2 which includes another embodiment of a scale-preventing device according to the invention.

FIGS. 2 and 3 illustrate clothes pressing irons 10 and 11 having integrated reservoirs. Each iron includes an external shell, or body, 14 to which is attached a lower casting 28 having an upper cover 29. Casting 28 and cover 29 form a steam chamber 26. Against the lower face of casting 28 is connected a pressing sole plate 20 made of stainless steel, aluminum, etc., with or without a coating, such as of enamel. This sole plate 20 is fixed, for example, by crimping all along its periphery and/or at the location of orifices 24 for the delivery of steam, orifice 24 being in communication with steam chamber 26. This casting 28 is heated by a network of heating resistances 22 which are usually over-molded.

A substantially horizontal main reservoir 30 is disposed at the interior of the shell 14, slightly below an upper central handle 12. The main reservoir 30 has a front inlet 32 for the introduction of water, this inlet 32 being closed by a baffle or a movable flap. As is best seen in FIG. 2, this main reservoir 30 is usually in direct communication with the steam chamber 26 by means of a "drop-by-drop" device of a known type. This latter device normally comprises a rod 36 situated at the middle of a flexible seal 38 having a calibrated central orifice. The position of this rod 36 in the middle of the seal 38 is controlled by a shank connected to a button emerging from the upper part of the shell 14. The rod 36 is arranged in a manner to be able to slide longitudinally through the seal 38. In a manner which is also known, the rod 36 is provided toward its lower end, in the zone coming in contact with the central opening of the seal 38, with a groove or recess 37. This recess 37 permits, according to its vertical position, or elevation, with respect to the central orifice of seal 38, to control the flow of water passing from the main reservoir 30 toward the steam chamber 26.

According to the simplified version of the invention illustrated in FIG. 2, the main reservoir 30 of the iron 10 is heated in its totality by auxiliary electric heating elements 46 connected or overmolded against or in the lower receptacle 33 of main reservoir 30. These heating elements 46 are regulated by independent electromechanical means, such as a bimetallic strip, or electronic means based on a temperature sensor, in such a manner that the main reservoir 30 is maintained at a temperature above 60° C. and preferably between 90° C. and 100° C., but just below the boiling point of water.

In order to limit the risks due to heat, the upper part 31 of the main reservoir 30 is insulated from the exterior by a double wall, if desired, placed under a partial vacuum. In a complementary manner, one can also provide a pad, or a mat, of fiberglass between main reservoir 30 and handle 12.

The water in main reservoir 30 is thus maintained at a temperature above 90° C. during the entire period when it is stored, usually longer than 10 minutes, which already permits attaining a significant rate of germination of potentially precipitatable mineral material. This water in contact with rod 36 is admitted directly into steam chamber 26 where the particulate mineral substance is entrained with the steam produced.

In a more elaborate version of a pressing iron 11, illustrated in FIG. 3, an auxiliary reservoir 40 is connected hydraulically in series between main reservoir 30 and rod 36. In order to make effective use of the available space, main reservoir 30 is retained in the forward part of shell 14, in relation with its inlet 32 for introducing tap water, and auxiliary reservoir 40 is placed at the rear of shell 14, in an extension of the lower part of main reservoir 30.

As illustrated in FIG. 3, main reservoir 30 and auxiliary reservoir 40 are in communication at the top by a baffle arrangement permitting preservation of an effective separation between the two volumes of water, one having to be heated and the other not, while assuring a periodic refilling of auxiliary reservoir 40. This arrangement is described in greater detail in French patent 2 648 485, the content of which is incorporated herein by reference. Auxiliary reservoir 40 presents at least one inlet orifice and opening 42 arranged in its upper face and situated at the interior of main reservoir 30. This arrangement comprises an inclined surface 34 starting from the bottom of main reservoir 30 and extending to slightly above the corresponding edge of the upper face of auxiliary reservoir 40. This upper edge defines with the upper surface of auxiliary reservoir 40 and the parallel upper wall of main reservoir 30 an upper communication passage.

Opening 42 allows escape of carbon dioxide, thus aiding degassing of the water in auxiliary reservoir 40, in order to promote germination and avoid a redissolution of the mineral materials in a body of water which is possibly cooled.

During clothes pressing, under the effect of movements of iron 11, water will ride up along inclined surface element 34, overflow the upper edge in order to be trapped in the passage and will finally enter into auxiliary reservoir 40. In addition, at each setting of iron 11 in a vertical position, i.e., on its heel, auxiliary reservoir 40 will be automatically filled with water.

A channel 44 arranged along the bottom of main reservoir 30 and opening into the lower part of auxiliary reservoir 40 leads water from auxiliary reservoir 40 to rod 36 in order for it to drip into steam chamber 26. The cross-section of channel 44 is optimized according to the maximum desired steam flow rate.

One can however also envision a connection of these two reservoirs according to the principal of communicating vessels as employed in connection with the embodiment of FIG. 1, the feed channel then attached against the lower face of the receptacle of main reservoir 30 being parallel to channel 44 such that auxiliary reservoir 40 is as high as main reservoir 30 and these two reservoirs can be effectively thermally separated, for example by a double wall.

Preferably, auxiliary reservoir 40 is maintained at a temperature of exactly 98° C. plus or minus 1° C., i.e., preferably just below boiling to avoid an uncontrolled turbulence. Laboratory tests have in effect shown that, at this temperature, one can rapidly precipitate the major part of the precipitatable mineral materials.

Auxiliary reservoir 40 comprises an individual heating module having heating elements 46 and an electromechanical or electronic regulation device. Heating elements 46 can be overmolded into the housing of the reservoir or cemented or otherwise attached against one wall.

According to a less costly alternative illustrated in FIG. 3 in broken lines, the heating of auxiliary reservoir 40 is assured by a metal thermo-bridge 48 whose lower end is fixed to casting 28, and whose upper end is firmly attached against the lower wall of auxiliary reservoir 40 by a suitable attachment element 49. This metal bridge 48 transmits by thermal conduction, from casting 28 having a controlled temperature, a quantity of heat predetermined by the dimensions and cross-section of metal bridge 48, this quantity being as close as possible to that necessary and sufficient for maintaining auxiliary reservoir 40 at its desired temperature.

Moreover, if the maximum width of auxiliary reservoir 40 is determined by that of shell 14, the length and depth of auxiliary reservoir 40 can be optimized so that the total volume corresponds to the maximum consumption of steam during the expected germination time.

In operation, as a result of movements of iron 11, water from main reservoir 30 crosses inclined surface element 34 and flows into auxiliary reservoir 40 via opening 42. It is heated in auxiliary reservoir 40 to around 98° C. before flowing via channel 44 toward rod 36 which controls steam generation. When rod 36 allows the water to flow, the water drops onto the interior face of casting 28 where it is vaporized. Mineral materials, preliminarily precipitated during passage in auxiliary reservoir 40 and entrained by the water, are deposited in a finally divided form on the hot wall and are entrained by the resulting steam, thus avoiding clogging of the iron.

In the case of an iron having an integrated reservoir, it is noted that agitation of heated water due to heating movements promotes germination. This is explained by the degassing which facilitates the formation of calcium carbonate. The influence of this degassing is accentuated by the presence of a deposit which, with agitation, is better distributed in the solution. Opening 42 serves moreover as an evacuation passage for the gases produced, thus promoting degassing of carbon dioxide.

Of course, the invention is not limited solely to the embodiments which have been described, and one can make any number of changes and modifications thereto without falling outside of the framework of the invention. One can in particular provide an iron whose reservoir is removable. In addition, the invention is not limited to pressing irons, and is applicable to any other type of household electrical appliance which generates steam, such as espresso machines.

One can, for example, provide as a "reservoir" any other reduced zone of the water circuit in which this water is retained during a minimum time corresponding to the expected germination time, for example less than three minutes. This reduced zone is then furnished with an adequate heating means and, if desired, a thermal protection.

One can also accelerate the germination of the mineral materials by allowing for the presence of a catalyst in the heating chamber. This catalyst can be natural or artificial rock, in the form of fragments or beads. As shown in FIG. 2, use can possibly be made of fragments or nodules of rock at the interior of a cage 35, possibly removable for replacement if clogged.

One can also envision to coat the internal walls of the heating reservoir by material preventing undesired crystallized scale formation in the form of sharp angles, for example a metal layer of stainless steel.

This application relates to subject matter disclosed in French Application number 96 00822, filed on Jan. 19, 1996, the disclosure of which is incorporated herein by reference.

We claim:

1. An electric appliance for producing steam, said appliance comprising: a reservoir for holding a quantity of water; steam generation means for effecting a substantially instantaneous generation of steam; and a scale preventing device, wherein said scale preventing device is connected and operative for heating water upstream of said reservoir by an amount sufficient to precipitate minerals present in the water into a form which allows the precipitated minerals to be expelled from the appliance with steam generated by said steam generation means.

2. An appliance according to claim 1 wherein said scale-preventing device defines a zone for heating the water.

3. An appliance according to claim 2 wherein the water contained in the heating zone is maintained at a temperature of at least above 60° C.

4. An appliance according to claim 3 wherein the temperature is between 90° C. and 100° C.

5. An appliance according to claim 3 wherein the water heating zone comprises a reservoir for heating the water.

6. An appliance according to claim 5 wherein said reservoir is a main reservoir and said scale-preventing device further comprises heating and temperature control means coupled to said reservoir.

7. An appliance according to claim 1 wherein said scale-preventing device further comprises means for activating germination of mineral particles.

8. An appliance according to claim 7 wherein said means for activating germination comprise a mass of rock fragments.

9. An appliance according to claim 1 wherein said scale-preventing device comprises an auxiliary reservoir and heating means operatively associated with said auxiliary reservoir.

10. An appliance according to claim 9 wherein said auxiliary reservoir is constructed to provide thermal protection in the vicinity of said auxiliary reservoir.

11. An appliance according to claim 9 wherein said auxiliary reservoir is coated with a refractory material.

12. An appliance according to claim 9 wherein said auxiliary reservoir is dimensioned to hold a volume of water corresponding to a maximum possible steam flow rate so that water is maintained in said auxiliary reservoir for a time sufficient to allow substantially all minerals in the water to germinate.

13. An appliance according to claim 12 wherein the time during which the water remains in said auxiliary reservoir is of the order of three minutes.

14. An appliance according to claim 9 further comprising: a clothes pressing iron containing said steam generation means; a fixed station containing said reservoir and said auxiliary reservoir; a supply tube connected between said fixed station and said steam generation means and said fixed station; a pump in said fixed station connected to said auxiliary reservoir and said supply tube for supplying water from said auxiliary reservoir to said steam generation means via said supply tube; and a conduit connected between said reservoir and said auxiliary reservoir by the principle of communicating vessels.

15. An appliance according to claim 9 further comprising a clothes pressing iron containing said steam generation means and a main reservoir for holding water in said steam iron, wherein: said steam generation means comprise a steam generation chamber; said main reservoir is disposed directly above said steam generation chamber; said auxiliary reservoir is located in proximity to said main reservoir; and said appliance further comprises a passage providing a flow path between said main reservoir and said auxiliary reservoir, and a channel forming a flow path between a lower portion of said auxiliary reservoir and said steam generation chamber.

16. An appliance according to claim 15 wherein said auxiliary reservoir has a bottom and an upper wall provided with an orifice forming part of said passage; said main reservoir has an inclined plate adjacent said auxiliary reservoir and having a lower edge located at said bottom of said auxiliary reservoir, said inclined plate extending to above said upper wall of said auxiliary reservoir; and said plate and said upper wall of said auxiliary reservoir define portions of said passage.

17. An appliance according to claim 16 further comprising a metal casting delimiting said steam generation chamber and wherein said heating means comprise a thermal bridge extending between said casting and said auxiliary reservoir for transferring heat at a predetermined rate capable of maintaining water in said auxiliary reservoir at a desired temperature.

18. An appliance according to claim 9 further comprising means for removing gas which is liberated from the water during precipitation of minerals.

19. An appliance according to claim 18 wherein said gas removing means are composed of at least one opening provided in a wall of said auxiliary reservoir.

20. A method for precipitating minerals dissolved in water in an electric appliance in which steam is generated substantially instantaneously and is then expelled from the appliance, said method comprising preheating a selected quantity of water, prior to steam generation, to a temperature and for a time sufficient to precipitate minerals present in the water into a form which allows the precipitated minerals to be expelled from the appliance with the generated steam.

21. A method according to claim 20 wherein the preheating temperature is greater than 60° C.

22. A method according to claim 21 wherein the preheating temperature is between 90° C. and 100° C.

* * * * *